United States Patent

Marzocchi

[15] 3,682,217
[45] Aug. 8, 1972

[54] TIRE CONSTRUCTION FEATURING GLASS AND ORGANIC CORD CARCASS PLIES

[72] Inventor: Alfred Marzocchi, 35 Thomas Leighton Blvd., R.F.D. #3, Cumberland, R.I. 02864

[22] Filed: June 9, 1970

[21] Appl. No.: 44,823

[52] U.S. Cl..............................152/356, 152/362
[51] Int. Cl...........................................B60c 9/02
[58] Field of Search.......152/354, 355, 356, 357, 359

[56] References Cited

UNITED STATES PATENTS

| | | | |
|---|---|---|---|
| 3,095,027 | 6/1963 | Weber | 152/355 |
| 3,397,729 | 8/1968 | Sperberg | 152/354 |
| 3,433,689 | 3/1969 | Marzocchi | 156/96 |
| 3,543,828 | 12/1970 | Caille | 152/361 |

FOREIGN PATENTS OR APPLICATIONS

| | | | |
|---|---|---|---|
| 1,008,744 | 2/1952 | France | 152/354 |
| 452,865 | 8/1936 | Great Britain | 152/355 |

*Primary Examiner*—Arthur L. La Point
*Assistant Examiner*—Robert Saifer
*Attorney*—Staelin & Overman and Paul F. Stutz

[57] ABSTRACT

Tire constructions are disclosed which feature both organic cord carcass plies and/or belt plies and glass cord carcass plies and/or glass cord belt plies; the plies being so arranged and disposed that certain of the cord plies do not extend to the bead region, particularly into the bead turnup region, whereas other of the cord plies do extend into the bead and are turned up thereabout.

28 Claims, 7 Drawing Figures

PATENTED AUG 8 1972  3,682,217

INVENTOR.
ALFRED MARZOCCHI
BY Steelie Oerman
ATTORNEYS

TIRE CONSTRUCTION FEATURING GLASS AND ORGANIC CORD CARCASS PLIES

The present invention relates to tire manufacture and more particularly to unique tire constructions featuring reinforcement systems composed of glass and organic cord plies and various combinations thereof.

A variety of textile materials have historically been employed as reinforcement materials for tires. Thus, over the years, cotton, rayon, the polyamides such as nylon, the polyesters such as "DACRON" and, more recently, glass have been employed in cord and strand form, and usually in the form of a fabric, to form carcass plies, breaker strips and tread reinforcing belt plies. These various materials have their own individual shortcomings and, as well, of course, advantages. It is known in this regard, for example, that cotton is subject to degradation on exposure to moisture as well as undesirable elongation. Rayon possesses the undesirable property of having a quite low modulus and is also characterized by low strength per unit cross-sectional area.

The various nylons, generically embraced by the term "polyamides", while having desirable strength, particularly as compared to rayon, have the undesirable property of exhibiting considerable elongation under load. The polyamides are also characterized by the fact that the tire cords formed thereof exhibit the undesirable attribute of thermal set. This is usually manifested by the fact that the driver of a car equipped with nylon cord reinforced tires discerns a noticeable thump, particularly on startup in cold weather. This thump is due to the fact that the nylon cords tend to become set during cool weather in the region of the tire in contact with the ground; which segment of the tire is deflected by reason of the weight of the car being borne by the wheels and the nylon cords. The carcass thus develops somewhat of a "flat spot" in that region of the tire in contact with the ground. This "flat spot" results in the tire exhibiting a thump as the tire rotates when the car is put into motion. The thump gradually disappears as heat is built up in the tire, causing the nylon cords to elongate to their original length; thus eliminating the flatness.

A particularly difficult and troublesome area of the tire from a standpoint of reinforcement is the bead region. Thus, it has been found that an effective reinforcement of the tire necessitates that the edge portions of the carcass ply must be firmly anchored in the bead region. Accordingly, it has been customary practice to have the carcass reversely folded about the hoop-like, usually metal, wire beads. The bead turnup area is thus characterized by a reverse fold of the side-by-side cords of which the carcass fabric ply is composed and puts a considerable amount of bending stress upon the cords. These stresses frequently result in defects and zones of weakness which frequently result in tire failure.

With the foregoing introduction, it may be stated that it is a general object of the present invention to provide a tire construction which features a reinforcement system which embodies both organic and inorganic materials in the various plies and at the same time, by reason of particular geometric placement of the various plies, reduces the problems of reinforcement in the bead region and at the same time improves carcass reinforcement from the standpoint of strength and, as well, flexibility of design possibilities.

It is a particular object of the present invention to provide a tire construction featuring a plurality of plies, certain of which are formed of organic materials and certain of which are formed of inorganic materials and further characterized by the fact that certain of the carcass plies do not extend completely about the bead in the conventional turnup arrangement conventionally employed.

It is another particular object of the present invention to provide a novel tire construction featuring a plurality of belt plies inclusive of organic and inorganic cords.

It is yet another significant object of the present invention to provide such a tire construction which features a particular arrangement of plies inclusive of both organic and inorganic.

It is still another object of the present invention to provide a convenience in manufacture in the tire building according to the "flat band" technique in that the drum set is not as critical and therefore more easily accomplished.

It is still another object of the present invention to provide a tire construction, as described, featuring both organic cord ply and inorganic cord ply reinforcement; the inorganic reinforcement being composed of relatively short lengths of cords formed of a gathered-together array of glass filaments.

The foregoing, as well as other and additional objects of the present invention, will become apparent to those skilled in the art from the following detailed description taken in conjunction with the annexed sheets of drawings on which there are presented, for purposes of illustration only, several preferred embodiments of the tire construction of the present invention.

Considered most basically, the present invention envisions a tire construction featuring multiple abutting plies; the cords in one ply differing in material from the cords in the adjacent ply and, in particular, a construction wherein a ply formed of one material extends about and is turned up around the bead, whereas the ply formed of the other material, while extending into the side wall, stops short of the bead.

Figure 1:
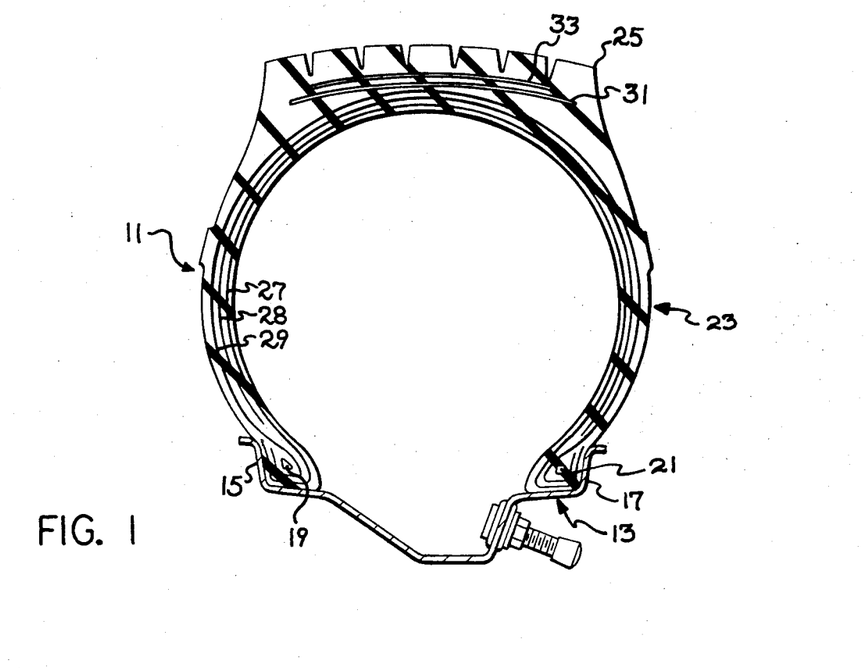
FIG. 1 is a right-sectional view of a tire of the invention schematically illustrating carcass and belt plies and particularly the placement thereof in accordance with one embodiment of the present invention.

Referring now more specifically to the drawings, there is disclosed in FIG. 1 a tire 11 mounted on a rim 13 having turned up rim flanges 15 and 17 in and against which are mounted the annular spaced beads 19 and 21 of tire 11. A body carcass 23 extends from bead to bead to define the torus shape of the tire. At the crown of the toroidal carcass is formed a ground contacting tread 25. The body carcass 23 includes three carcass plies 27, 28 and 29 which are respectively disposed interiorly of the carcass, with the carcass ply 27 being the radially innermost ply, the carcass ply 29 being the outermost ply and the carcass ply 28 sandwiched therebetween. Situated in the crown region of the tire above the carcass plies and beneath yet coextensive with the tread are a pair of belt plies 31 and 33. In accordance with the preferred embodiment of the present invention, the carcass plies 27 and 29 are composed of generally mutually parallel cords formed of organic material, while the carcass ply 28 contains glass as a reinforcement. Within the broader aspect of the present invention, the term "synthetic organic material" includes natural occurring material such as cotton, the rayons, the polyamides and/or the polyester type material, usually in cord or strand form. Most preferably, as illustrated, the inner and outer plies, respectively 27 and 29, proceed down into the bead region and are turned up about the beads 19 and 21, as shown. In contrast, in accordance with the present invention, the centermost carcass ply 28, which includes glass as a reinforcement, extends from just short of the one bead 19 to just short of the other bead 21, as illustrated. The cords in the carcass plies 27 and 29, if angularly disposed, are generally inclined in such fashion that the angles of the cords in one ply are opposite but equal to the angle of the cords in the other ply. In some instances, it may be preferable to have the cords in the plies 27 and 29 proceed in the shortest possible path from one bead to the other so as to define an angle of 90° with the peripheral or circumferential centerline of the tire, although the principal advantages pertaining to ease of drum set is more significant in bias inclined cord carcass tires.

Figure 2:
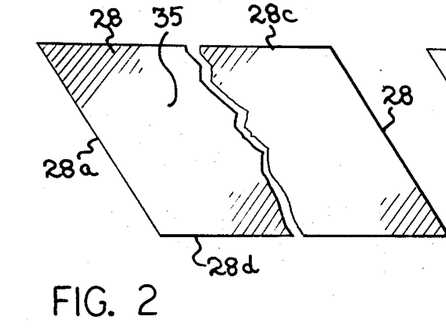
FIG. 2 is a top plan view of a particular carcass reinforcement ply according to the present invention.

In accordance with one embodiment of the present invention, the carcass ply 28 takes the form illustrated in FIG. 2, wherein it can be seen that the cords identified by the reference numeral 35 (and shown in single line schematic) are formed of a gathered-together array of continuous glass filaments; the cords being angularly disposed. The ply 28 has its forward edge 28a and trailing edge 28b cut on a bias in conventional fashion; these edges meeting in abutting relationship as this carcass ply is wrapped about the cylinder during the tire building operation. It will be understood that the tire building operation is performed in conventional fashion, utilizing the well-known "flat band" technique, wherein the various components are laid up in known fashion onto a collapsible drum. The edges 28a and 28b are thus beveled for purposes of providing an edge to edge overlap, followed by appropriate knitting together, employing conventional or appropriate solvents and knurled knitting tools. The solvent, of course, is selected according to the constitution of the particular elastomer of which the tire body is formed. The ends of the cords 35, of which ply 28 is composed, are not anchored in the bead and are movable to a degree such that the tire may be expanded during the Bag-O-Matic type vulcanization of the tire in its final torus or toroidal configuration. Thus, reference to FIG. 1 readily reveals that carcass ply 28 does not extend down and around the bead as do the ends or lateral edges of carcass plies 27 and 29.

Figure 3:
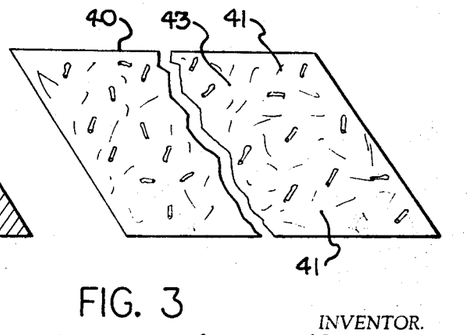
FIG. 3 is a top plan view of another tire reinforcing ply in accordance with a further embodiment of the present invention.

In accordance with a further embodiment of the present invention, the carcass ply 28 takes the form illustrated schematically in FIG. 3 and identified by the reference numeral 40. In this embodiment of the present invention, the carcass ply consisting of an elastomeric sheet contains, distributed therethrough, a plurality of lengths of glass cords identified by the reference numeral 41. These cords are produced by chopping on appropriate commercial cutters continuous cords of gathered-together continuous filaments of glass. The cutters, as may be appreciated, may be adjusted to chop the lengths into any desired lengths. Generally, the length of the chopped cord should fall within the range of about ¼ inch to 6 inches, preferably from about ½ inch to 4 inches in length. The sheet containing the chopped lengths of glass cords is formed by first preparing a mill mix of the selected rubber stock and adding the chopped lengths of glass cords onto the masticated stock. The amount of chopped glass cords or bundles can be varied to meet the particular service conditions or to arrive at a sheet having a particularly desired range of modulus. Usually, it is desired that the mill mixing not be continued for any appreciable length of time beyond that necessary to achieve a distribution of the cords through the mill mix since, particularly when the mill rolls are set at a spacing, the bundles or cords will experience a breakup into individual filaments 43 or groups of filaments of less size than the cord started with. Under some circumstances, it is desirable to have a proportion of the glass in the sheet for the carcass ply in the form of separated bundles or cords and even to the extent of having individual filaments present in the elastomeric matrix. It is also possible and desirable within the purview of the present invention to control the mill mixing of the chopped bundles or cords of gathered-together glass filaments in such a manner that the lengths of cords in aggregate demonstrate a degree of orientation. This orientation will be generally in the direction of the movement of the stock about the drum to which the stock is adhered. The milled material is then removed from the mill and calendered to appropriate carcass ply thickness, followed by a bias cutting into appropriate sizes for the particular tire under consideration and with the orientation of the preponderance of the cords so inclined as to complement or augment the reinforcement of the carcass of the tire in conjunction with the reinforcement achieved by the particular angular disposition of the cords formed of organic material in the inner carcass ply 27 and outer carcass ply 29. It is also possible within the purview of the present invention and represents a particularly desirable embodiment for the orientation of the chopped lengths to be adjusted by appropriate bias cutting such that the orientation of the chopped cords is generally parallel with the circumference of the tire.

Figure 4:
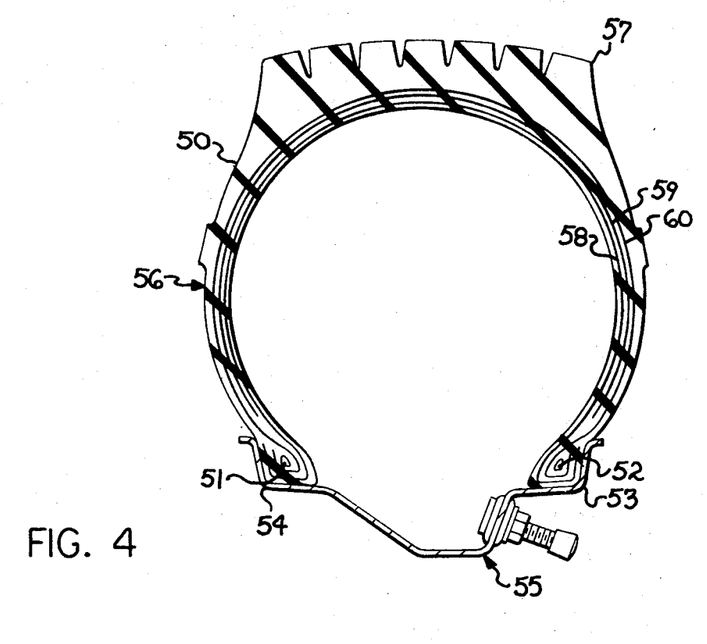
FIG. 4 is a view similar to FIG. 1 and schematically illustrates a carcass construction in accordance with an alternative embodiment of the present invention.

Reference may now be had to FIG. 4, wherein there is disclosed a tire of the invention 50 featuring spaced beads 51 and 52 mounted in flange seats 53 and 54 of a rim 55. A carcass 56 extends toroidally from one bead to another and secured to the crown thereof is a ground contacting tread 57. The carcass body of the tire includes three interior carcass reinforcing plies 58, 59 and 60 which are respectively the innermost, centermost and outermost plies. Plies 58 and 60 are turned up in conventional fashion about the bead, as shown, whereas centermost ply 59 stops short of the bead, as shown. In accordance with the present invention, adjacent plies are formed of different cord materials. Thus, the plies 58 and 60, like the plies 27 and 29 of the embodiment of FIG. 1, are formed Of cords formed of synthetic organic and/or natural occurring materials, whereas the centermost ply 59 features a glass cord in continuous or chopped form, as described hereinbefore. The tire of the present embodiment does not feature tread reinforcing belts. Selection of cord angles, selection of the cord materials and particularly selection of the ply to be formed of disposed chopped glass cords as illustrated in FIG. 3, and combinations of these selections, represent differing embodiments of the present invention. In the tire construction of FIG. 4, the orientation of the continuous cords or the orientation of the major proportion of the chopped lengths of cords and/or filaments is generally such as to define an angle with the peripheral centerline of the tire. A particularly desirable tire features a cord angle falling between about 25° and 45° with the peripheral centerline. A particularly useful construction includes a carcass structure wherein the innermost and outermost plies 58 and 60, respectively, are formed of organic yarns, strands or filaments, while the centermost ply 59 is formed of a chopped glass cord containing stock material as illustrated in FIG. 3. Thus, it will be appreciated that the modulus of the centermost ply can be varied to a considerable extent by selection of the amount of glass and the selection of the proper proportioning of chopped bundles or cords and chopped lengths of separated bundles and/or cords. The latter, of course, is controlled by the time of mixing. A greater amount of mixing will find a greater proportion of the glass being present in the form of filaments and/or strands smaller than the cords originally introduced onto the mill. A centermost ply such as the one 59 also permits the utilization of less organic cords in the innermost and outermost plies 58 and 60.

Considerable variability as to the centermost ply can also be achieved by selection of the character of the glass cord. By way of explanation, glass cords are prepared by combining and plying a plurality of strands and/or yarns, each composed of a multiplicity of individual glass filaments gathered together as they are drawn from the platinum bushing in which the molten glass resides. Thus, it is possible to form strands of 204, 408, 816 and up to 2,000 filaments by appropriate selection of a bushing having the appropriate number of apertures from which the filaments are drawn, attenuated and gathered together into strand, usually with a slight amount of twist and accompanied by an application of a suitable size, such as starch or the like. A plurality of strands of a given number of filaments is then combined on appropriate textile equipment to form multiple strand yarns having the desired amount of twist. The yarns are then combined with like yarns to form the final cord. A particularly desirable cord is formed by combining 7 strands, each composed of 408 individual filaments. Most desirably, the cords are impregnated with an elastomeric impregnant of desired composition as will be described hereinafter. The elastomeric impregnated cords are most desirably and easily combined with the rubber sheet material in an appropriate calendering operation in the case of producing carcass ply sheet goods containing continuous cords in generally mutual parallel relationship. Similarly, in the chopped forms, the elastomeric impregnated cords are most easily combined into a mill mix. Most importantly, the elastomeric impregnated cords, upon vulcanization, demonstrate a desirable compatible integration, with the elastomeric stock forming the bulk of the tire structure.

Figure 5:
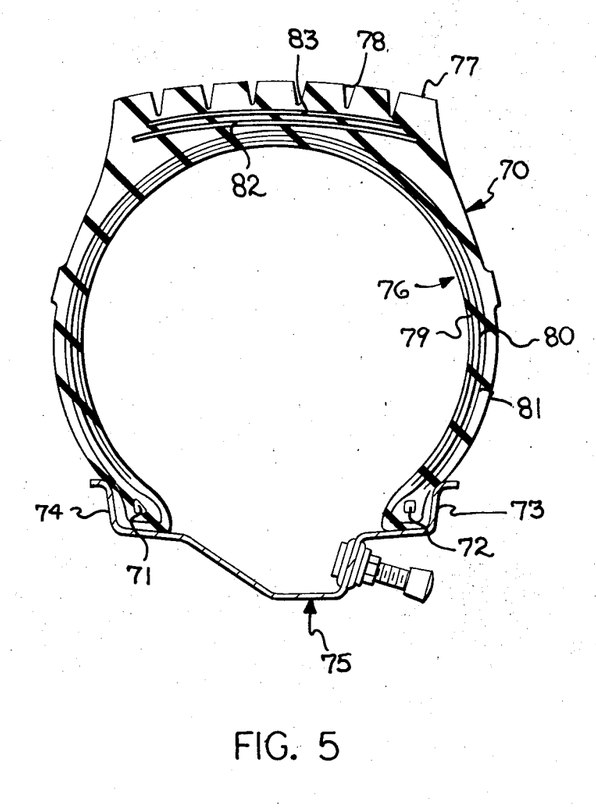
FIG. 5 is a sectional view similar to FIG. 1, but illustrating still another construction arrangement of plies in accordance with the present invention.

Referring now to FIG. 5, there is disclosed a tire 70 of the invention inclusive of beads 71 and 72 seated in flange seats 73 and 74 of the rim member 75. A carcass body 76 extends connectingly in toroidal fashion from one bead to the other and about the crown thereof is secured a ground contacting tread 77 provided with suitable grooves 78. The carcass body includes three plies 79, 80 and 81. Carcass ply 79 is the radially innermost ply, while carcass ply 81 is the radially outermost ply, with the centermost carcass ply 80 sandwiched therebetween. A pair of belt plies 82 and 83 extend circumferentially about the crown region of the tire between the carcass plies and the tread; the belt plies being generally laterally coextensive with the tread, as illustrated, with the outermost belt ply 83 being somewhat narrower than the lower or innermost belt ply 82. As can be seen, in accordance with the present embodiment, the radially innermost carcass ply 79 and the radially outermost carcass ply 81 do not extend down into the bead region but stop short thereof. In contrast, the centermost carcass ply 80 proceeds down into the bead region and is wrapped about the individual beads in the manner illustrated. Preferably, in one embodiment, the centermost carcass ply is composed of cords formed of organic material, whereas the other plies, namely, plies 79 and 81, are composed of sheet goods containing cords of glass, either in the form of mutually parallel continuous cords as, for example, illustrated in the carcass ply shown in FIG. 2 or in the form of chopped lengths of glass as illustrated in the carcass ply of FIG. 3. The latter is preferred for the innermost ply 79 since generally location of continuous glass cords in the innermost ply can prove difficult when it is considered that the glass in such case tends to be in compression after the distortion of expansion during Bag-O-Matic cure. As in the embodiment of FIG. 1, the cords of the several plies may be selected from about any angle in the range 25° to 45°, With generally in the range 35° to 40° being preferred. The cords in the organic plies are generally selected so that the angle of the cords in one of the plies 79 is equal but opposite to the angle of the cords in the ply 81. The ply 80 is usually bias cut in order that the orientation of the continuous cords or the orientation of the major portion of chopped lengths is complimentary to the angular disposition of the cords in the other two plies. In accordance with an alternative embodiment of the present invention, the tire construction of FIG. 5 features cords in carcass ply 80 which are radially disposed. That is, the fabric containing the continuous or chopped cords is bias cut in such a manner that the cords will define an angle of 90° with the peripheral centerline of the tire. In this embodiment, the plies 79 and 81 are formed of organic cords generally in mutually parallel relationship and the sheet containing same being bias cut in such a manner that the cords, when laid up on the drum, will proceed in bias fashion from bead to bead and, in the ultimately formed tire, define an angle of 20° to 35° with the peripheral centerline of the tire. In accordance with the embodiment of the invention illustrated in FIG. 5, the belt plies 82 and 83 are composed of different cord materials. Thus, if the cords of belt ply 83 are formed of organic material, the cords in the belt ply 82 are formed of the inorganic material such as glass. The arrangement of the belt plies 82 and 83 may, of course, be reversed in terms of the composition of the cord material. Under certain circumstances, of course, it may be desirable to have the belt plies 82 and 83 feature cords formed of the same material, be it glass or organic. The belt plies may also be three in number, in which case a desirable combination includes glass in the outer belt plies and organic cords in the centermost ply. Considerable amount of latitude is provided by the tire construction of FIG. 5, considering that one or the other of the belt plies may be formed in the manner described and illustrated in connection with FIG. 3, so that the modulus of the belt ply can be adjusted in the manner described to meet a wide variety of service capabilities.

In accordance with a further embodiment of the present invention, the centermost ply 80 is formed of cords which are radially disposed; that is, as to define an angle of 90° with the peripheral centerline of the completed tire. Additionally, these cords are formed of a multiplicity of gathered-together strands and/or yarns, each in turn formed of a gathered-together array of continuous glass filaments. Also, the outermost ply 81 is formed of cords of a polyester material such as marketed under the trade name "DACRON," while the innermost carcass ply 79 is formed of cords of a polyamide material such as nylon. The cords of the innermost and outermost plies, respectively 79 and 81, are disposed at an angle to the peripheral centerline; the angles being selected for the cords in each ply such that the cords define an equal but opposite angle to the cords in the other ply. The belt plies 82 and 83 desirably include cords which are formed of a combined array of strands and/or yarns, each in turn formed of a multiplicity of continuous glass filaments. The glass cords in the belt plies 82 and 83 desirably define an angle ranging from about 15° to 30°. This angle is achieved by appropriate bias cutting of the fabric of which the cords are composed in such manner that the belt plies are wrapped circumferentially about the flat band so that the cord angle in the "green" state ranges from about 35° to 55°. It will be appreciated that the tire of FIG. 5 will inherently possess the properties of the materials of which the cords in the various carcass and belt plies are composed. The tires just described are capable of being built on flat band equipment.

Figure 6:
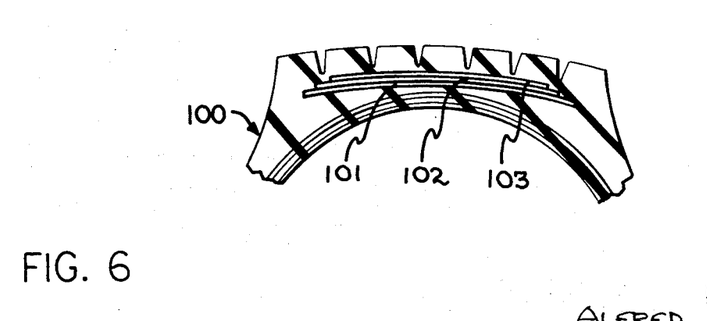
FIG. 6 is a partial sectional view otherwise similar to FIG. 1 and serving to illustrate an alternate embodiment of the present invention.

Referring now more specifically to FIG. 6, there is shown a tire 100 in accordance with a further embodiment of the present invention. The tire 100 is particularly characterized by the belt assembly. As can be seen, the belt assembly is composed of an innermost belt ply 101, a centermost belt ply 102 and an outermost belt ply 103. In accordance with the present invention, the cords of which the belts are composed are formed of different materials. A preferred belt assembly includes a lowermost belt ply 101 composed of an elastomeric sheet containing, distributed therethrough, cords of glass. The outermost belt ply 103 is similarly composed, while the centermost belt ply 102 is formed of an elastomeric sheet containing cords of an organic material such as rayon, the polyamides such as nylon and the polyesters such as "DACRON." In a particularly preferred embodiment, the belt plies 101 and 103 are composed of an elastomeric sheet containing the glass cords in the form of relatively short chopped lengths ranging from one-fourth inch to several inches in length, most preferably in the range of ½ inch to 1 inch in length. The cords may be either randomly distributed therethrough in terms of orientation or, most preferably, the milling of the sheet is controlled so as to provide at least a degree of orientation of the chopped lengths of cords. Then the sheet, after calendering to the desired thickness, is so cut on the bias cutter that the major proportion of the chopped lengths are oriented as to define an angle ranging from about 10° to 30° with the peripheral centerline. The preparation of the sheet containing lengths of chopped glass cords has been described previously herein. It is also within the scope of the present invention to provide a tire as illustrated in FIG. 6 wherein the composition and makeup of the belt ply assembly is the reverse of that described; namely, the centermost belt ply 102 is formed of a glass reinforced elastomeric sheet, while the innermost and outermost carcass plies 101 and 103, respectively, are composed of an elastomeric sheet containing organic cords.

Figure 7:
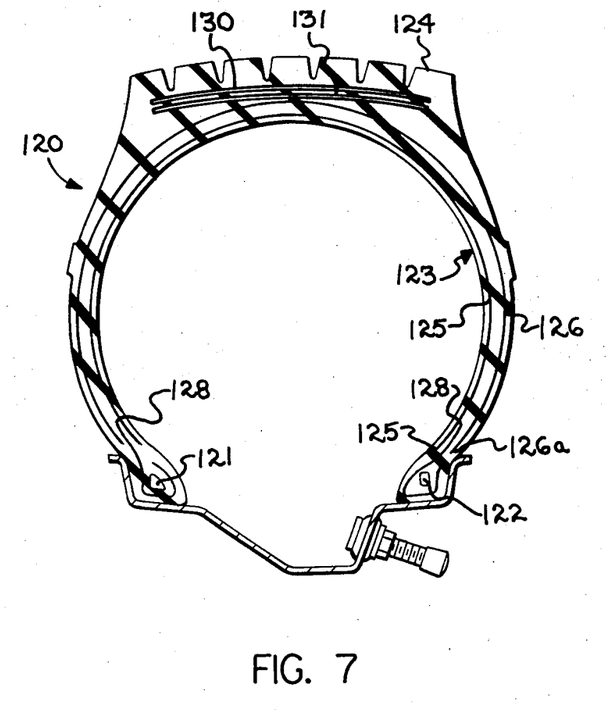
FIG. 7 is yet another sectional view similar to FIG. 1 schematically illustrating an arrangement of carcass plies in accordance with a further embodiment of the present invention.

Reference may now be had to FIG. 7 wherein there is disclosed a tire 120 which, in accordance with the present invention, is composed of spaced beads 121 and 122 connected by a toroidal carcass 123 having secured to the crown region thereof a tread 124. The body carcass is characterized by two principal carcass plies 125 and 126 which extend throughout the carcass but having terminal edges 125a and 126a which do not extend down into the bead region. The tire 120 includes bead encircling partial carcass plies 128. As can be seen, these plies are not continuous, one bead to the other, but rather commence partially midway in the side wall, proceed down into the bead region and are turned up thereabout, stopping in the turnup area just short of the edge 126a of the outermost carcass ply 126. Each of these bead carcass ply segments 128 in extending up into the side wall are sandwiched between carcass plies 125 and 126. It may be noted that the lateral edges of these latter plies, identified by the reference numerals 125a and 126a, are somewhat off-set or staggered with respect to the carcass proper. In accordance with one embodiment of the present invention, the principle carcass plies 125 and 126 are composed of elastomeric sheets containing cords formed of a plied together array of yarns and/or strands, each in turn formed of a multiplicity of glass filaments. The bead-encircling partial carcass ply segments 128 contain, on the other hand, cords formed of an organic material such as rayon, nylon or the polyesters such as "DACRON." In place of continuous glass cords, the principal carcass plies 125 ans 126 may be formed of a sheet of the appropriate elastomer containing chopped lengths of glass cords together with chopped lengths of glass filaments. A sheet of such composition is described hereinabove in terms of its composition and method of preparation. A desirable attribute of the tire of the present embodiment resides in its capability of being manufactured or built on flat band equipment, albeit that the particular embodiment is employing continuous glass cords in radial disposition. The tire of FIG. 7, particularly in the embodiment featuring glass carcass cords radially disposed, includes a pair of belt plies 130 and 131. The belt plies 130 and 131 include glass reinforcement either in the form of continuous glass cords disposed at appropriate angles to the peripheral centerline or composed of chopped lengths of cords and/or filaments in a manner previously described.

The glass filaments which are drawn from the platinum bushing and thereafter combined with like filaments to form strands, which are in turn combined with like strands to form yarns and in turn formed into cords, are desirably treated, as indicated, with an appropriate size. A variety of size formulations are disclosed in application Ser. No. 406,501, filed Oct. 26, 1964, entitled "Glass Fibers Treated For Combination With Elastomeric Materials And Method;" said application having issued as U.S. Pat. No. 3,391,052 on July 2, 1968 and assigned to the same assignee as the present application. A typical size composition is composed of 0.5 to 2.0 percent by weight of gamma-aminopropyl-triethoxy silane, 0.1 to 0.5 percent by weight of a cationic lubricant such as an amino polyester or a cationic softener, such as glycerine, and the remainder composed of water. Further, as indicated previously herein, the strands, yarns or cords formed of the assembled plurality of continuous glass filaments are desirably impregnated with an elastomeric impregnant which assists in the ultimate attachment thereof to the surrounding rubber matrix in the ultimate tire. Usually, the glass in cord form is impregnated by immersion in an appropriate impregnant bath, followed by drying to a nontacky state. A suitable impregnant is composed of 60 to 40 parts by weight of a 38 percent dispersed solids system including a butadiene-styrene-vinyl pyridine terpolymer latex, a butadiene styrene latex and a resorcinol-formaldehyde resin; the solids being dispersed in 40 parts by weight of water. A workable commercial product is marketed under the trade name "LOTOL 5440;" which product is marketed by Uniroyal, formerly U.S. Rubber Company.

It will be appreciated that the tire constructions in accordance with the present invention are possessed of a broad range of service capabilities as may be varied by appropriate selection of the proper combination of carcass and/or belt plies from the possibilities suggested or disclosed herein. Thus, it will be appreciated that by selection of the amount of chopped lengths and through the bias cutting control as to achieve a particular major orientation of the chopped lengths in the side wall region, the spring rate in the side wall region can be controlled to accommodate the shortcomings of the various organic cord plies.

It is to be appreciated, of course, that the various constructions disclosed herein are primarily for purposes of disclosing optimum modes of practicing the present invention. Other combinations will be suggested to those skilled in the art from the foregoing description and the drawings particularly illustrating the preferred embodiments.

I claim:

1. A tire construction comprising:
   means for attachment to a wheel comprising a pair of spaced circular bead rings embedded in an essentially elastomeric bead region adapted for releasable engagement with rim flanges of a wheel,
   a body carcass defining a torus connecting with said bead region and
   a ground engaging tread carried at the crown of said toroidally shaped carcass,
   said carcass including a first ply containing cords formed of organic material and having side terminal edges which are turned reversely up about said bead rings and a second ply, containing glass reinforcement, which extends from one bead region to the other bead region but having side terminal edges which stop short of said bead rings.

2. A tire construction as claimed in claim 1, which includes a third ply like said first ply.

3. A tire construction as claimed in claim 2, wherein said second ply is located between said first and third plies.

4. A tire construction as claimed in claim 3, wherein the innermost of said carcass plies contains chopped lengths of glass and said outermost ply contains continuous parallel cords formed of continuous glass filaments in gathered-together array.

5. A tire construction as claimed in claim 3, wherein said glass reinforcement comprises a plurality of generally mutually parallel cords extending from side edge to side edge of said ply and defining an angle with the circumferential centerline of said tire.

6. A tire construction as claimed in claim 3, wherein said glass reinforcement is composed of discontinuous glass fibers.

7. A tire construction as claimed in claim 3, wherein said glass reinforcement comprises discontinuous lengths of glass cords formed of a gathered-together plurality of glass filaments.

8. A tire construction as claimed in claim 7, wherein said discontinuous lengths are majorly oriented.

9. A tire construction as claimed in claim 7, wherein said glass reinforcement includes discontinuous lengths of glass filaments in addition to said discontinuous lengths of cords.

10. A tire construction as claimed in claim 9, wherein said synthetic organic material is selected from the group consisting of the polyamides, the polyesters and rayon.

11. A tire construction comprising:
    means for attachment to a wheel comprising a pair of spaced circular bead rings embedded in an essentially elastomeric bead region adapted for releasable engagement with rim flanges of a wheel,
    a body carcass defining a torus, said carcass including a first ply containing cords formed of organic material and having side terminal edges which are turned reversely up about said bead rings and a second ply, containing glass reinforcement, which extends from one bead region to the other bead region but having side terminal edges which stop short of said bead rings, a ground engaging tread carried at the crown of said toroidally shaped carcass and a plurality of belt plies in abutting relationship extending circumferentially about said carcass beneath said tread and generally coextensive therewith, one of said belt plies consisting essentially of an elastomeric matrix containing a plurality of mutually parallel cord reinforcements formed of synthetic organic material and one of said belt plies consisting essentially of an elastomeric matrix containing an amount of glass.

12. A tire construction as claimed in claim 11, wherein said belt plies are three in number, the outer two of which consisting of an elastomeric matrix containing an amount of glass and the centermost of which consists essentially of an elastomeric matrix containing a plurality of mutually parallel cord reinforcements formed of synthetic organic material.

13. A tire construction as claimed in claim 12, wherein said glass reinforcement is in the form of a plurality of mutually parallel cords, each composed of a gathered-together array of continuous glass filaments.

14. A tire construction as claimed in claim 12, wherein said glass reinforcement is in the form of a plurality of short lengths of glass cords, each comprising a gathered-together array of glass filaments.

15. A tire construction as claimed in claim 14, wherein a majority of said short lengths are oriented in the same direction.

16. A tire construction as claimed in claim 12, wherein said body carcass includes a third ply like said first ply.

17. A tire construction as claimed in claim 16, wherein said second ply is located between said first and third plies.

18. A tire construction as claimed in claim 17, wherein said glass reinforcement comprises a plurality of mutually parallel cords extending from edge to edge and defining an angle with the circumferential centerline of said tire.

19. A tire construction as claimed in claim 17, wherein said glass reinforcement is composed of discontinuous glass fibers.

20. A tire construction as claimed in claim 17, wherein said glass reinforcement is composed of discontinuous lengths of glass cords formed of a gathered-together plurality of glass filaments.

21. A tire construction as claimed in claim 20, wherein said discontinuous lengths are majorly oriented.

22. A tire construction as claimed in claim 20, wherein said glass reinforcement includes discontinuous lengths of glass filaments in addition to said discontinuous lengths of cords.

23. A tire construction as claimed in claim 20, wherein said synthetic organic material is selected from the group consisting of the polyamides, the polyesters and rayon.

24. A tire construction comprising:

a pair of spaced circular bead rings embedded in an essentially elastomeric bead region adapted for releasable engagement with rim flanges of a wheel, a body carcass defining a torus connected to said beads, and a ground engaging tread carried at the crown of said toroidally shaped carcass, said carcass including at least one carcass ply including glass reinforcement, said ply extending toroidally from bead region to bead region, with the terminal edges thereof stopping short of said bead encircling rings, and a pair of bead encircling plies including organic cord reinforcement, each of said bead plies at least partially encircling its corresponding bead ring and extending partially into the side wall past the edge of said glass containing ply.

25. A tire construction as claimed in claim 24 wherein said tire includes a second carcass ply including glass reinforcement, said carcass ply extending from one bead region to the other but stopping just short of said bead rings, said glass containing plies and said bead encircling plies being constructed and arranged such that the terminal edges of said organic cord bead encircling plies are sandwiched between said first and second glass containing carcass plies.

26. A tire construction as claimed in claim 25, wherein said glass is composed of generally mutually parallel cords, each composed of a multiplicity of continuous glass filaments.

27. A tire construction as claimed in claim 26, wherein said glass reinforcement is composed of generally short lengths of cords, each composed of a multiplicity of glass filaments.

28. A tire construction as claimed in claim 27, wherein said glass reinforcement includes lengths of individual filaments.

* * * * *